(12) United States Patent
Davis

(10) Patent No.: US 7,156,044 B1
(45) Date of Patent: Jan. 2, 2007

(54) ANTENNA-MOUNTED SIGN FOR VEHICLES

(76) Inventor: John W. J. Davis, P.O. Box 248, Lake Villa, IL (US) 60046

( * ) Notice: Subject to any disclaimer, the term of this patent is extended or adjusted under 35 U.S.C. 154(b) by 0 days.

(21) Appl. No.: 11/115,514

(22) Filed: Apr. 28, 2005

(51) Int. Cl.
    *A63H 33/40* (2006.01)
(52) U.S. Cl. .............. 116/28 R; 116/173; 40/591; 40/479; 40/412; 40/440; 446/217
(58) Field of Classification Search .......... 116/28 R, 116/173, 174; 40/591, 592, 479, 412, 422, 40/417, 440; D11/181, 182, 166, 165, 141; 428/31, 542.2; D14/232; D20/21; 446/436, 446/242, 217, 218, 34, 35, 36
See application file for complete search history.

(56) References Cited

U.S. PATENT DOCUMENTS

| | | | | |
|---|---|---|---|---|
| 265,841 | A * | 10/1882 | Marteeny | 40/479 |
| 1,380,325 | A * | 5/1921 | Schlirf | 446/218 |
| 1,435,106 | A * | 11/1922 | Comiskey | 40/413 |
| 2,810,223 | A | 10/1957 | Fraesdorf, Jr. | |
| 3,090,142 | A * | 5/1963 | Anderson | 40/479 |
| D207,477 | S | 4/1967 | McLarty | |
| 3,636,912 | A * | 1/1972 | Kamp | 116/28 R |
| 5,078,075 | A * | 1/1992 | Liming et al. | 116/173 |
| 5,261,851 | A * | 11/1993 | Siebert, Jr. | 446/236 |
| 5,267,525 | A * | 12/1993 | Person et al. | 116/202 |
| 5,363,792 | A * | 11/1994 | Petechik | 116/28 R |
| D373,601 | S | 9/1996 | Jackle | |
| 5,735,230 | A | 4/1998 | Romesburg | |
| 5,740,622 | A | 4/1998 | Martin | |
| 5,816,187 | A * | 10/1998 | Jimmie | 116/173 |
| 5,953,841 | A * | 9/1999 | Sawyer | 40/479 |
| 6,247,423 | B1 | 6/2001 | Ingram et al. | |
| 6,609,476 | B1 | 8/2003 | Lorenzana et al. | |
| 6,760,988 | B1 * | 7/2004 | Bardeleben | 40/591 |
| 2003/0116076 | A1 | 6/2003 | Hoyos | |
| 2003/0172567 | A1 * | 9/2003 | Zentner et al. | 40/591 |
| 2005/0217557 | A1 * | 10/2005 | Caetano et al. | 116/28 R |
| 2005/0263060 | A1 * | 12/2005 | Armstrong | 116/28 R |
| 2006/0070283 | A1 * | 4/2006 | Engler | 40/591 |

* cited by examiner

*Primary Examiner*—Diego Gutierrez
*Assistant Examiner*—Travis Reis

(57) ABSTRACT

An apparatus conjoinable to a vehicle antenna includes an anchor section formed from STYROFOAM (polystyrene) and provided with a vertically registered sleeve extending along a longitudinal axis. The sleeve extends upwardly from a bottom surface of the anchor and terminates subjacent to a top surface thereof. Coextensively shaped wing sections are conjoinable with the anchor section and equidistantly spaced about an outer surface thereof. A mechanism is included for positioning the apparatus about the vehicle antenna and allows for free rotation thereof in the wind. The apparatus positioning mechanism is disposed within the anchor section and is sized and shaped so that the anchor section can be maintained at a stable position during operating conditions. The apparatus positioning mechanism is formed from non-corrosive material.

15 Claims, 4 Drawing Sheets

ANTENNA-MOUNTED SIGN FOR VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to signs for vehicles and, more particularly, to an antenna-mounted sign for vehicles.

2. Prior Art

The invention relates generally to flags and pennants that are mounted temporarily or permanently to the radio antenna of an automobile or truck. These flags or pennants have typically been composed of either a flexible fabric material such as cloth or light plastic or of a substantially rigid material, usually a plastic material. The location on the automobile radio antenna for the mounting of a flag or pennant is preferred because this location provides a prominent, elevated position, which is readily visible by the public as the automobile or truck passes by on the street. Unfortunately, the mounting of such flags or pennants on vehicle antennas is limited to fixed, vertical antennas and is not suitable for the retractable antennas or the angled non-vertical antennas.

The purpose of such flags or pennants may be merely decorative or for advertising some company, product or coming event. They are also used to designate cars as being part of a funeral procession or some other type of parade or procession. Whatever the purpose or type of use of an antenna mounted flag or pennant, it may be necessary or important to have a mounting which provides for easy installation and removal of the flag on the antenna. As a consequence of the damage likely to be caused to such flags or pennants in a commercial car wash, for instance, they should be readily removable to avoid such damage, a feat not possible with those flags currently found in the prior art.

It should be understood that fabric or flexible antenna flags or pennants tend to flap or whip violently when the vehicle on which they are mounted is driven at elevated speeds. Thus, a flag made of inexpensive cotton material may disintegrate rapidly on a car traveling at 65 miles an hour. It has also been noted that violent wind action, even at lower speeds, tends to whip the flag around so much that it is difficult to discern whatever is imprinted on the flag or pennant. In contrast, the rigid type of flag or pennant remains relatively fixed at any speed and is not subject to the problems of visibility and wear described above in connection with the flexible, fabric flags or pennants.

Accordingly, a need remains for an antenna-mounted sign for vehicles in order to overcome the above-noted shortcomings. The present invention satisfies such a need by providing an antenna-mounted sign that is convenient to use, easy to install and remove, reasonably priced, and has the ability to direct people to the correct location of a special gathering. The words of such a sign are easily read, while also rotating and flashing in an alternating manner, thus easily catching a passerby's eye. The sign can bear various types of phrases, thus not limiting it to only one specific event or gathering, allowing the sign to be repeatedly used. Such a sign is appealing to a wide variety of people due to its practical, durable, eye-catching and reusable design.

BRIEF SUMMARY OF THE INVENTION

In view of the foregoing background, it is therefore an object of the present invention to provide an antenna-mounted sign for vehicles. These and other objects, features, and advantages of the invention are provided by a novelty apparatus removably conjoinable to a vehicle antenna.

The apparatus includes an anchor section formed from STYROFOAM (polystyrene) and provided with a vertically registered sleeve extending along a centrally aligned longitudinal axis. Such a sleeve extends upwardly from a bottom surface of the anchor section and terminates subjacent to a top surface of the anchor section. The anchor section may be provided with a plurality of slots equidistantly spaced about the outer surface thereof. Each of the slots extends radially from the axis and has linear shapes for effectively receiving a selected portion of the wing sections respectively.

A plurality of wing sections are directly conjoinable with the anchor section. Such wing sections are equidistantly offset from the axis and equidistantly spaced about an outer surface of the anchor section. The wing sections are coextensively shaped for effectively providing a uniform rotation during operating conditions. The wing sections preferably include monolithically formed inner and outer portions. Such inner portions are sized and shaped for being interfitted within the slots while the outer portions radially extend away from the outer surface of the anchor section. The outer portions of the wing sections may be provided with surface indicia for conveniently displaying a predetermined message.

The present invention further includes a mechanism for positioning the apparatus about the vehicle antenna such that the anchor section and the wing sections can conveniently freely rotate in clockwise and counter clockwise directions during traveling conditions. Such an apparatus positioning mechanism is disposed within the anchor section and is suitably sized and shaped so that the anchor section can advantageously be maintained at a substantially stable position during operating conditions. The apparatus positioning mechanism is formed from non-corrosive material.

Such an apparatus positioning mechanism preferably further includes a rigid and stationary insert directly nested within an interior wall of the sleeve. The insert has an arcuate top end portion situated above a center of mass of the anchor section for effectively balancing the wing sections about the vehicle antenna. A rigid and mobile insert is permanently intercalated within the sleeve and directly engageable with the stationary insert in such a manner that the mobile insert can conveniently freely rotate within the sleeve and cause the anchor and wing sections to contemporaneously rotate therewith. Such a mobile insert has a closed top end portion provided with an arcuate shape for cooperating with the arcuate top end portion of the stationary insert during rotational movements.

Each of the stationary and mobile inserts preferably have a monolithically formed flange portion protruding outwardly away therefrom and radially extending thereabout from the axis. Such flange portions advantageously restrict the mobile insert from disengaging the stationary insert during traveling conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
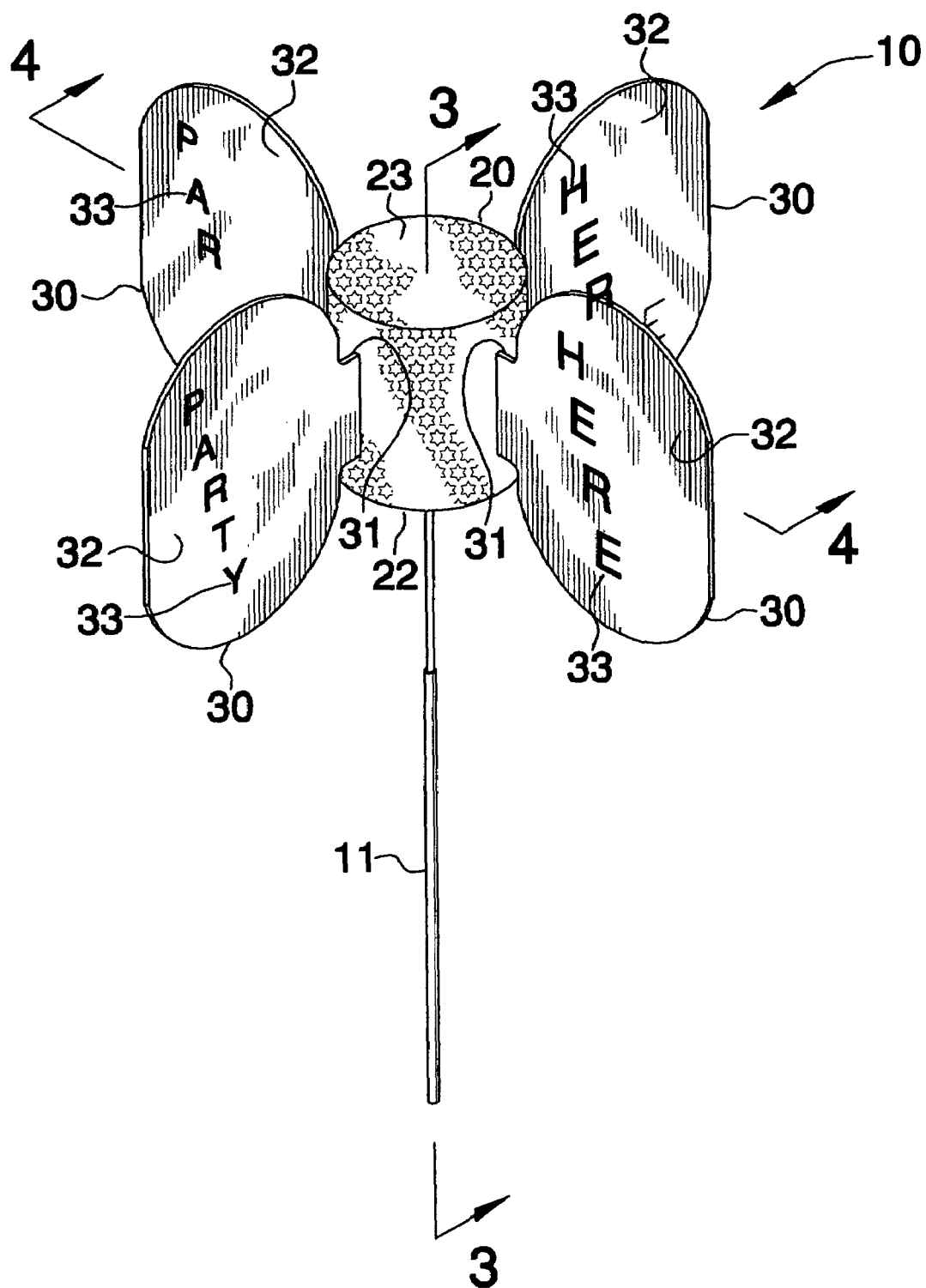
FIG. 1 is a perspective view showing an antenna-mounted sign for vehicles, in accordance with the present invention.
Figure 2:
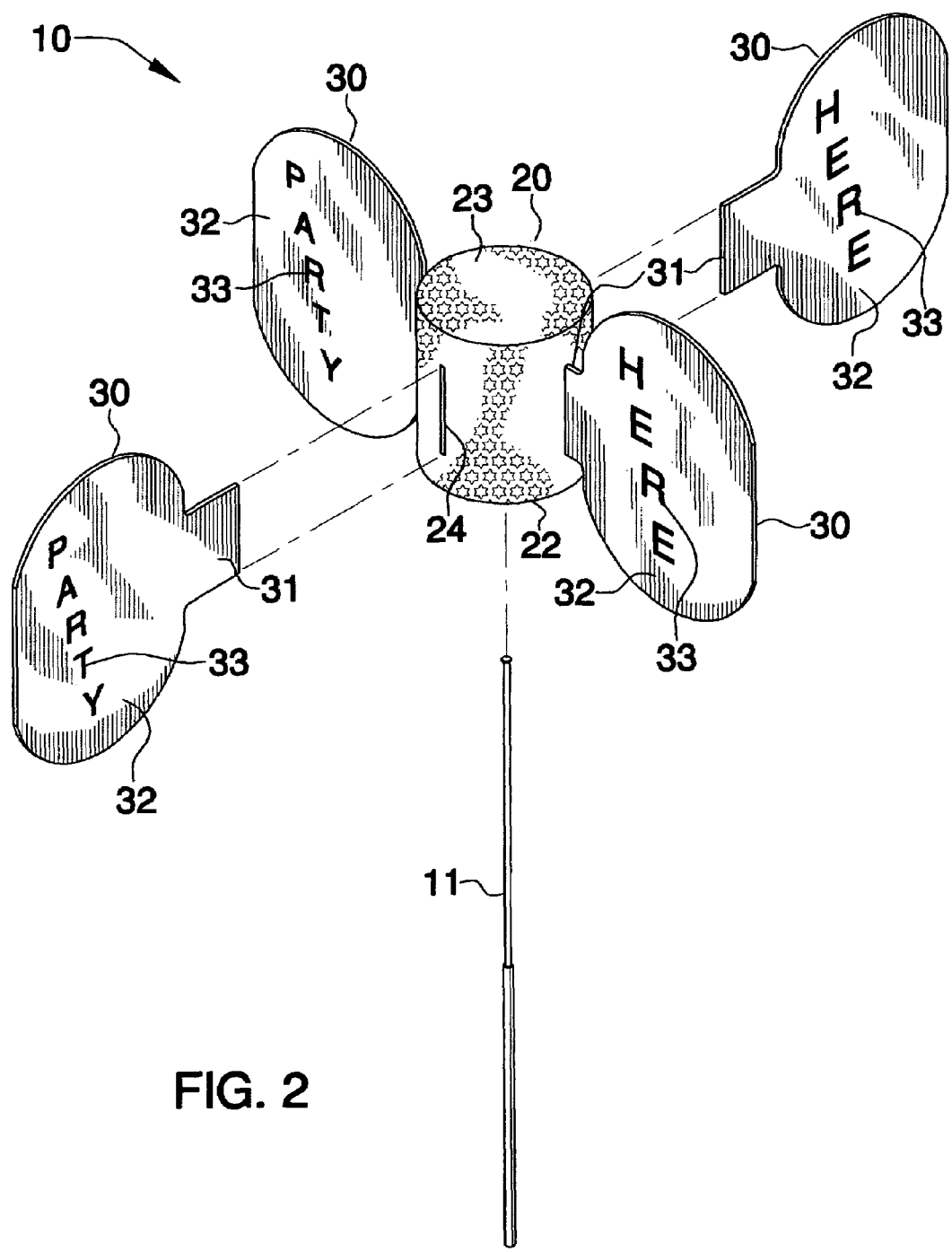
FIG. 2 is a partially exploded perspective view of the apparatus shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–5 by the reference numeral 10 and is intended to provide an antenna-mounted sign for vehicles. It should be understood that the apparatus 10 may be mounted on many different types of rod structures and should not be limited in use to only vehicle antennas.

Figure 3:
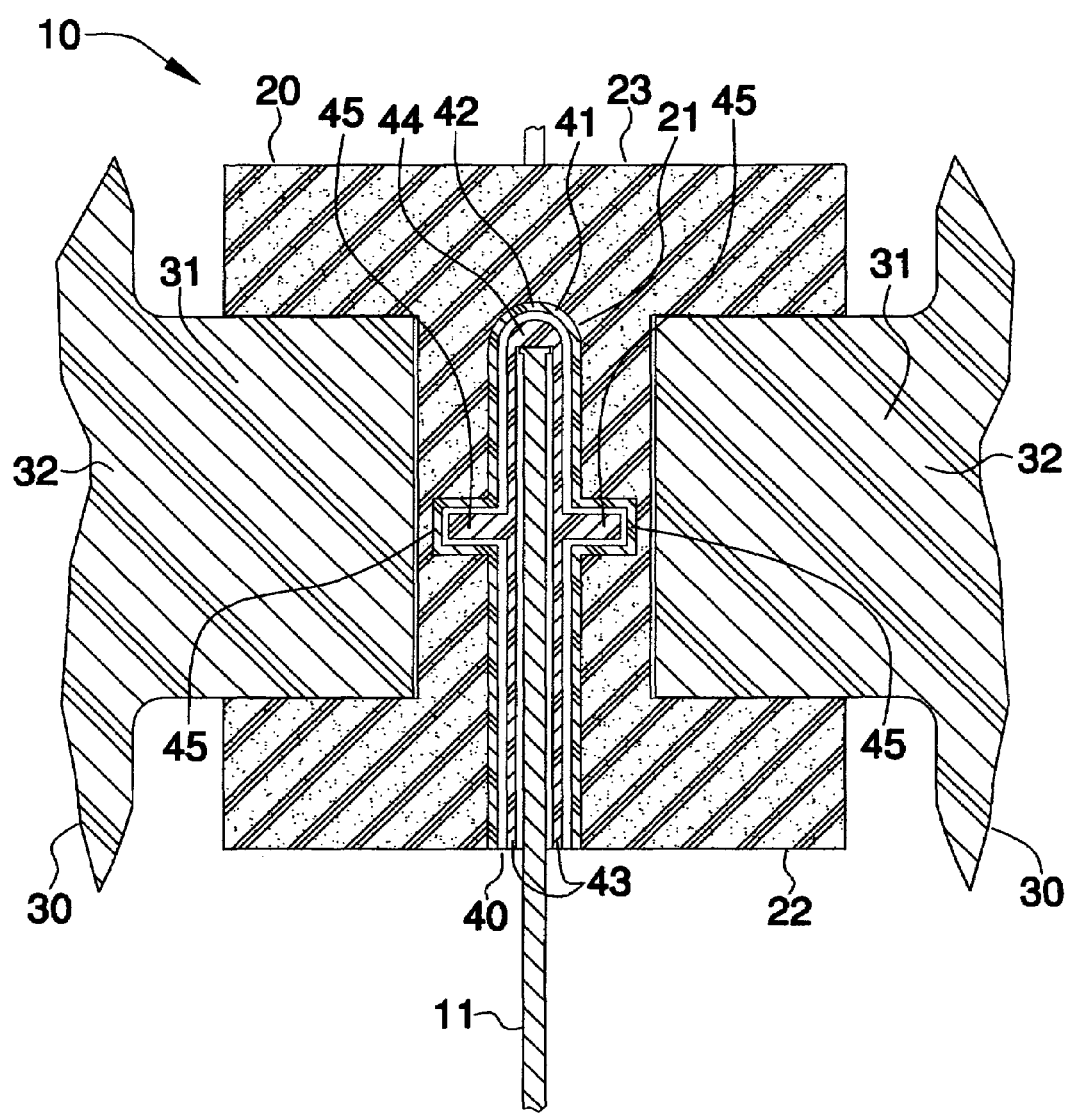
FIG. 3 is a cross-sectional view of the apparatus shown in FIG. 1, taken along line 3—3 and showing the apparatus positioning mechanism.

Referring initially to FIGS. 1 and 3, the apparatus 10 includes an anchor section 20 formed from STYROFOAM (polystyrene) and provided with a vertically registered sleeve 21 extending along a centrally aligned longitudinal axis. Of course, the anchor section 20 may be produced from alternate materials such as light and sturdy plastics, as is obvious to a person of ordinary skill in the art. Such a sleeve 21 extends upwardly from a bottom surface 22 of the anchor section 20 and terminates subjacent to a top surface 23 of the anchor section 20. It is anticipated that the anchor section 20 may also be covered in a light reflecting material so that the apparatus 10 is more readily visible from a distance.

Of course, a solar or battery powered light emitting diode may also be incorporated into the anchor section 20 to further increase the visibility of the apparatus 10 during night time use, as is obvious to a person of ordinary skill in the art. The anchor section 20 is provided with a plurality of slots 24 equidistantly spaced about the outer surface thereof. Each of the slots 24 extends radially from the axis and has linear shapes for effectively receiving a selected portion 31 of the wing sections 30 (described herein below) respectively.

Referring to FIGS. 1 through 5, a plurality of wing sections 30 is directly conjoinable, with no intervening elements, with the anchor section 20. Such wing sections 30 are equidistantly offset from the axis and equidistantly spaced about an outer surface of the anchor section 20. The wing sections 30 are coextensively shaped for effectively providing a uniform rotation during operating conditions. Such wing sections 30 include monolithically formed inner 31 and outer 32 portions. The inner portions 31 are sized and shaped for being interfitted within the slots 24 while the outer portions 32 radially extend away from the outer surface of the anchor section 20. Such outer portions 32 of the wing sections 30 are provided with surface indicia 33 for conveniently displaying a predetermined message. Although a generally oval shape is attributed to the outer portions 32 in the figures included herewith, it is anticipated that such outer portions 32 may be alternately shaped, as is obvious to a person of ordinary skill in the art.

Furthermore, the surface indicia 33 displayed on the outer portions 32 may announce a variety of events including, but not limited to, birthdays, Christmas, New Year's, graduations, bachelor parties, retirement announcements, new born baby announcements, and popular holiday announcements. Another obvious and useful application for the apparatus 10 would be to place "FOR SALE" surface indicia 33 (not shown) on the outer portion 32 and then to employ those signs in new or used car lots for a more effective method of advertising an ongoing car sale.

Figure 4:
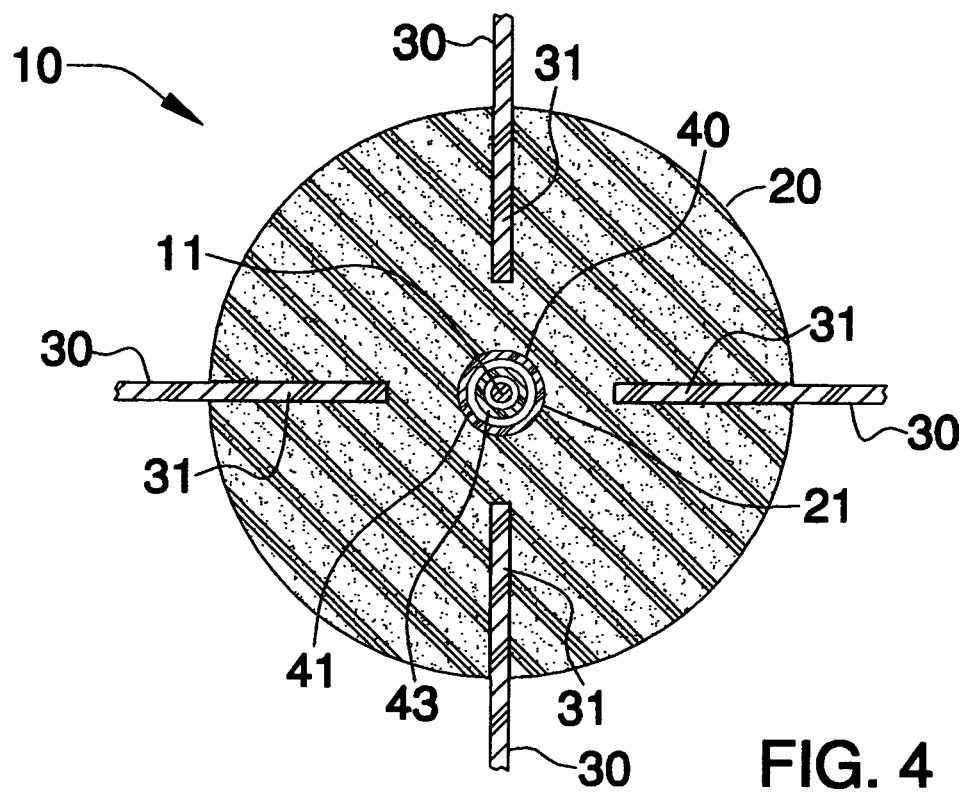
FIG. 4 is a cross-sectional view of the apparatus shown in FIG. 1, taken along line 4—4 and showing the inner wing portions interfitted with the anchor section slots.
Figure 5:
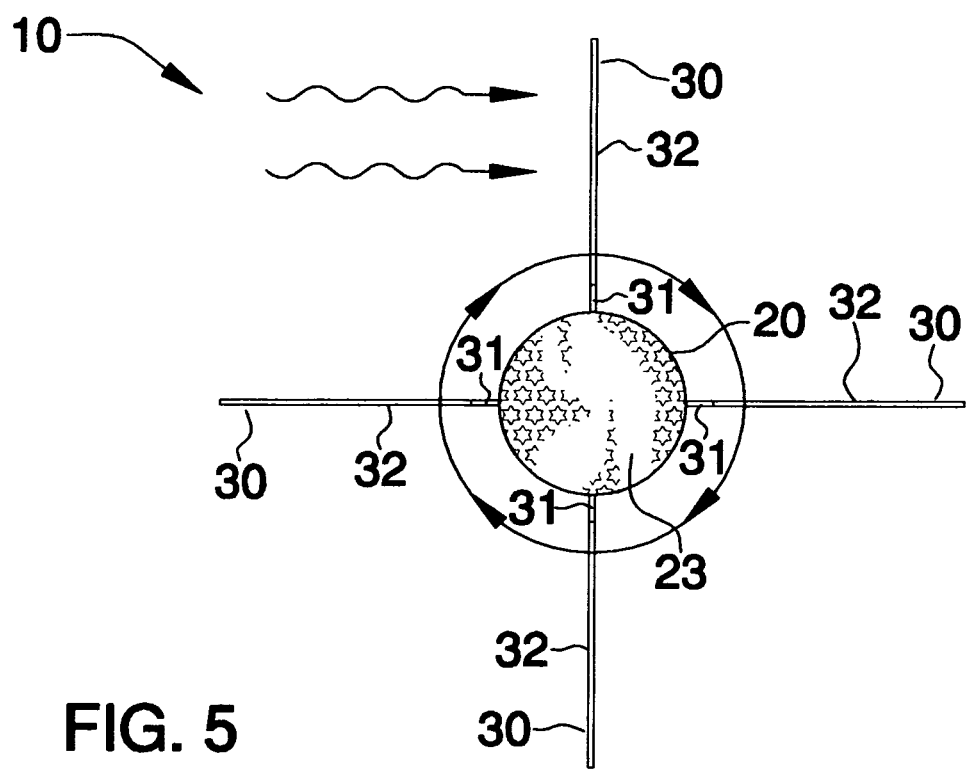
FIG. 5 is a top plan view of the apparatus shown in FIG. 1.

Referring to FIGS. 3 and 4, the present invention further includes a mechanism 40 for positioning the apparatus 10 about the vehicle antenna 11 such that the anchor section 20 and the wing sections 30 can conveniently freely rotate in clockwise and counter clockwise directions in the wind. Of course, the apparatus positioning mechanism 40 may be positioned about other rod-like structures, such as a stake pushed into the soil, as is obvious to a person of ordinary skill in the art. Such an apparatus positioning mechanism 40 is disposed within the anchor section 20 and is suitably sized and shaped so that the anchor section 20 can advantageously be maintained at a substantially stable position during operating conditions. The apparatus positioning mechanism 40 is formed from non-corrosive material to advantageously increase the durability of the apparatus 10, thus allowing for outdoors and extended periods of use.

Still referring to FIGS. 3 and 4, such an apparatus positioning mechanism 40 further includes a rigid and stationary insert 41 directly nested, with no intervening elements, within an interior wall of the sleeve 21. The insert 41 has an arcuate top end portion 42 situated above a center of mass of the anchor section 20 that is essential for effectively balancing the wing sections 30 about the vehicle antenna 11. A rigid and mobile insert 43 is permanently intercalated within the sleeve 21 and directly engageable, with no intervening elements, with the stationary insert 41 in such a manner that is vital so that the mobile insert 43 can conveniently freely rotate within the sleeve 21 and cause the anchor 20 and wing sections 30 to contemporaneously rotate therewith. Such a mobile insert 43 has a closed top end portion 44 provided with an arcuate shape for cooperating with the arcuate top end portion 42 of the stationary insert 41 during rotational movements.

Referring to FIG. 3, each of the stationary 41 and mobile 43 inserts have a monolithically formed flange portion 45 protruding outwardly away therefrom and radially extending thereabout from the axis. Such flange portions 45 advantageously restrict the mobile insert 43 from disengaging the stationary insert 41 during traveling conditions, thus allowing for employment of the apparatus 10 while driving.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

The invention claimed is:

1. A novelty apparatus removably conjoinable to a vehicle antenna, said apparatus comprising:
   an anchor section formed from STYROFOAM and provided with a vertically registered sleeve extending along a centrally aligned longitudinal axis, said sleeve extending upwardly from a bottom surface of said anchor section and terminating subjacent a top surface of said anchor section;
   a plurality of wing sections directly conjoinable with said anchor section, said wing sections being equidistantly offset from the axis and equidistantly spaced about an outer surface of said anchor section; and
   means for positioning said apparatus about the vehicle antenna such that said anchor section and said wing sections can freely rotate in clockwise and counter clockwise directions in the wind, said apparatus positioning means being disposed within said anchor section and being suitably sized and shaped so that said anchor section can be maintained at a substantially stable position during operating conditions;
   wherein said apparatus positioning means comprises
   a rigid and stationary insert directly nested within an interior wall of said sleeve, said insert having an arcuate top end portion situated above a center of mass of said anchor section for balancing said wing sections about the vehicle antenna; and
   a rigid and mobile insert permanently intercalated within said sleeve and directly engageable with said stationary insert in such a manner that said mobile insert can freely rotate within said sleeve and cause said anchor and wing sections to contemporaneously rotate therewith, wherein said mobile insert has a closed top end portion provided with an arcuate shape for cooperating with said arcuate too end portion of said stationary insert during rotational movements.

2. The apparatus of claim 1, wherein said anchor section is provided with a plurality of slots equidistantly spaced about said outer surface thereof, each of the slots radially extending from the axis and having linear shapes for receiving a selected portion of said wing sections respectively.

3. The apparatus of claim 2, wherein each said wing sections comprise: monolithically formed inner and outer portions, said inner portions being sized and shaped for being interfitted within the slots while said outer portions radially extend away from said outer surface of said anchor section.

4. The apparatus of claim 3, wherein said outer portions of said wing sections are provided with surface indicia for displaying a predetermined message.

5. The apparatus of claim 1, wherein each said stationary and mobile inserts have a monolithically formed flange portion protruding outwardly away therefrom and radially extending about from the axis, said flange portions restricting said mobile insert from disengaging said stationary insert during traveling conditions.

6. A novelty apparatus removably conjoinable to a vehicle antenna, said apparatus comprising:
   an anchor section formed from STYROFOAM and provided with a vertically registered sleeve extending along a centrally aligned longitudinal axis, said sleeve extending upwardly from a bottom surface of said anchor section and terminating subjacent a top surface of said anchor section;
   a plurality of wing sections directly conjoinable with said anchor section, said wing sections being equidistantly offset from the axis and equidistantly spaced about an outer surface of said anchor section; and
   means for positioning said apparatus about the vehicle antenna such that said anchor section and said wing sections can freely rotate in clockwise and counter clockwise directions in the wind, said apparatus positioning means being disposed within said anchor section and being suitably sized and shaped so that said anchor section can be maintained at a substantially stable position during operating conditions, said apparatus positioning means being formed from non-corrosive material;
   wherein said apparatus positioning means comprises
   a rigid and stationary insert directly nested within an interior wall of said sleeve, said insert having an arcuate top end portion situated above a center of mass of said anchor section for balancing said wing sections about the vehicle antenna; and
   a rigid and mobile insert permanently intercalated within said sleeve and directly engageable with said stationary insert in such a manner that said mobile insert can freely rotate within said sleeve and cause said anchor and wing sections to contemporaneously rotate therewith, wherein said mobile insert has a closed top end portion provided with an arcuate shape for cooperating with said arcuate top end portion of said stationary insert during rotational movements.

7. The apparatus of claim 6, wherein said anchor section is provided with a plurality of slots equidistantly spaced about said outer surface thereof, each of the slots radially extending from the axis and having linear shapes for receiving a selected portion of said wing sections respectively.

8. The apparatus of claim 7, wherein each said wing sections comprise: monolithically formed inner and outer portions, said inner portions being sized and shaped for being interfitted within the slots while said outer portions radially extend away from said outer surface of said anchor section.

9. The apparatus of claim 8, wherein said outer portions of said wing sections are provided with surface indicia for displaying a predetermined message.

10. The apparatus of claim 6, wherein each said stationary and mobile inserts have a monolithically formed flange portion protruding outwardly away therefrom and radially extending about from the axis, said flange portions restricting said mobile insert from disengaging said stationary insert during traveling conditions.

11. A novelty apparatus removably conjoinable to a vehicle antenna, said apparatus comprising:

an anchor section formed from STYROFOAM and provided with a vertically registered sleeve extending along a centrally aligned longitudinal axis, said sleeve extending upwardly from a bottom surface of said anchor section and terminating subjacent a top surface of said anchor section;

a plurality of wing sections directly conjoinable with said anchor section, said wing sections being equidistantly offset from the axis and equidistantly spaced about an outer surface of said anchor section, said wing sections being coextensively shaped for providing uniform rotation during operating conditions; and means for positioning said apparatus about the vehicle antenna such that said anchor section and said wing sections can freely rotate in clockwise and counter clockwise directions in the wind, said apparatus positioning means being disposed within said anchor section and being suitably sized and shaped so that said anchor section can be maintained at a substantially stable position during operating conditions, said apparatus positioning means being formed from non-corrosive material;

wherein said apparatus positioning means comprises a rigid and stationary insert directly nested within an interior wall of said sleeve, said insert having an arcuate top end portion situated above a center of mass of said anchor section for balancing said wing sections about the vehicle antenna; and a rigid and mobile insert permanently intercalated within said sleeve and directly engageable with said stationary insert in such a manner that said mobile insert can freely rotate within said sleeve and cause said anchor and wing sections to contemporaneously rotate therewith, wherein said mobile insert has a closed top end portion provided with an arcuate shape for cooperating with said arcuate top end portion of said stationary insert during rotational movements.

12. The apparatus of claim 11, wherein said anchor section is provided with a plurality of slots equidistantly spaced about said outer surface thereof, each of the slots radially extending from the axis and having linear shapes for receiving a selected portion of said wing sections respectively.

13. The apparatus of claim 12, wherein each said wing sections comprise: monolithically formed inner and outer portions, said inner portions being sized and shaped for being interfitted within the slots while said outer portions radially extend away from said outer surface of said anchor section.

14. The apparatus of claim 13, wherein said outer portions of said wing sections are provided with surface indicia for displaying a predetermined message.

15. The apparatus of claim 11, wherein each said stationary and mobile inserts have a monolithically formed flange portion protruding outwardly away therefrom and radially extending about from the axis, said flange portions restricting said mobile insert from disengaging said stationary insert during traveling conditions.

* * * * *